United States Patent [19]

Pollitzer

[11] 3,879,484

[45] Apr. 22, 1975

[54] HYDROCARBON ISOMERIZATION PROCESS

[75] Inventor: Ernest L. Pollitzer, Skokie, Ill.

[73] Assignee: Universal Oil Products Company, Des Plaines, Ill.

[22] Filed: Oct. 1, 1970

[21] Appl. No.: 77,329

Related U.S. Application Data

[60] Division of Ser. No. 802,207, Feb. 25, 1969, Pat. No. 3,679,602, which is a continuation-in-part of Ser. No. 723,886, April 24, 1968, abandoned.

[52] U.S. Cl....... 260/668 A; 260/666 A; 260/683.2; 260/683.65
[51] Int. Cl.............................................. C07c 5/24
[58] Field of Search......... 260/666 A, 668 A, 683.2, 260/683.68

[56] References Cited

UNITED STATES PATENTS 3,415,737  12/1968  Kluksdahl.......................... 208/139

Primary Examiner—C. Davis
Attorney, Agent, or Firm—James R. Hoatson, Jr.; Robert W. Erickson

[57] ABSTRACT

Isomerizable hydrocarbons including paraffins, cycloparaffins, olefins and alkylaromatics are isomerized by contacting the hydrocarbon at isomerization conditions with a catalytic composite of alumina having combined therewith a platinum group metallic component, a halogen component and a rhenium component.

12 Claims, No Drawings

HYDROCARBON ISOMERIZATION PROCESS

CROSS REFERENCES TO RELATED APPLICATIONS

This application is a division of my copending application Ser. No. 802,207, filed Feb. 25, 1969, now U.S. Pat. No. 3,679,602, July 25, 1972, which is a continuation-in-part of my application Ser. No. 723,886, filed Apr. 24, 1968, now abandoned, the teachings of which are specifically incorporated herein.

BACKGROUND OF THE INVENTION

This invention relates to a process for isomerizing isomerizable hydrocarbon particularly isomerizable paraffins, cycloparaffins, olefins, and alkylaromatics. More particularly, this invention relates to a process for isomerizing isomerizable hydrocarbons with a catalystic composite of alumina having combined therewith a platinum group metallic component, a halogen component, and a rhenium component.

Isomerization processes for the isomerization of hydrocarbons have acquired significant importance within the petrochemical and petroleum refining industry. The demand for the xylene isomers, particularly para-xylene, has resulted in the need for processes for isomerizing xylenes and ethylbenzene to obtain a desired xylene isomer such as para-xylene. Also, the need for brached chain paraffins such as isobutane or isopentane as intermediates for the production of high octane motor fuel produced by alkylation, it is desired that the final alkylate be highly brached. This can be accomplished by alkylating isobutane or isopentane with a $C_4$-$C_7$ internal olefin which, in turn, can be produced by the isomerization of the linear alpha-olefin by shifting the double bond to a more central position.

SUMMARY OF THE INVENTION

Accordingly, it is an object of this invention to provide a process for isomerizing isomerizable hydrocarbons. More specificaally, it is an object of this invention to provide an isomerization process using a particular isomerization catalyst effective in isomerizing isomerizable hydrocarbons without introducing undesired decomposition reactions.

In a broad embodiment, this invention relates to a process for isomerizing an isomerizable hydrocarbon which comprises contacting said hydrocarbon with a catalytic composite of alumina having combined therewith a platinum group metallic component, a halogen component, and a rhenium component.

In a more specific embodiment, this invention relates to the isomerization of either a saturated or olefinic isomerizable hydrocarbon by contacting the hydrocarbon with the aforementioned catalytic composite at isomerization conditions which include a temperature of about 0° C. to about 425° C., a pressure of about atmospheric to about 100 atmospheres, and a liquid hourly space velocity of about 0.1 to about 10 hr.$^{-1}$. In another limited embodiment, this process relates to the isomerization of an isomerizable alkylaromatic hydrocarbon by contacting an alkylaromatic with the aforementioned catalytic composite at isomerization conditions which include a temperature of about 0° C. to about 600° C., a pressure of about atmospheric to about 100 atmospheres, a liquid hourly space velocity of about 0.1 to about 20.0 hr.$^{-1}$ and a hydrogen to hydrocarbon mole ratio of about 0.5:1 to about 20:1.

In a more specific embodiment, the catalytic composite used in isomerizing the foregoing isomerizable hydrocarbons contains, on an elemental basis, about 0.1 to about 5 wt. percent halogen, about 0.01 to about 1 wt. percent platinum group metal, and about 0.01 to about 1 wt. percent rhenium.

In another embiodment, this invention relates to a catalytic composite which comprises alumina, having combined therewith a platinum group metallic and a Freidel-Crafts metal halide component.

Other objects and embodiments referring to alternative isomerizable hydrocarbons and to alternative catalytic compositions will be found in the following further detailed description of this invention.

DESCRIPTION OF PREFERRED EMBODIMENTS

The process of this invention is applicable to the isomerization of isomerizable saturated hydrocarbons including acyclic paraffins and cyclic naphthenes and is particularly suitable for the isomerization of straight chain or mildly branched chain paraffins contaning 4 or more carbon atoms per molecule such as normal butane, normal pentane, normal hexane, normal heptane, normal octane, etc., and mixtures thereof. Cycloparaffins applicable are those ordinarily containing at least 5 carbon atoms in the ring such as alkylcyclopentanes and cyclohexanes, including methylcyclopentane, dimethylcyclopentane, cyclohexane, methylcyclohexane, dimethylcyclohexane, etc. This process also applies to the conversion of mixtures of paraffins and/or naphthenes such as those derived by selective fractionation and distillation of straight-run natural gasolines and naphthas. Such mixtures of paraffins and/or naphthenes include the so-called pentane fractions, hexane fractions, and mixtures thereof. It is not intended to limit this invention to these enumerated saturated hydrocarbons and it is contemplated that straight or branched chain saturated hydrocarbon containing up to about 20 carbon atoms per molecule may be isomerized according to the process of the present invention with $C_4$-$C_7$ n-alkanes being particularly preferred.

The olefins applicable within this isomerization process are generally a mixture of olefinic hydrocarbons of approximately the same molecular weight, including the 1-isomer, 2-isomer, and other position isomers, capable of undergoing isomerization to an olefin in which the double bond occupies a more centrally located position in the hydrocarbon chain. The process of this invention can be used to provide an olefinic feedstock for motor fuel alkylation purposes containing an optimum amount of the more centrally located double bond isomers, by converting the 1-isomer, or other near terminal position isomer into olefins wherein the double bond is more centrally located in tne carbon atoms chain. The process of this invention is also applicable to the isomerization of such isomerizable olefinic hydrocarbons such as the isomerization of 1-butene to 2-butene or the isomerization of the 3-methyl-1-butene to 2-methyl-2-butene. Also, the process of this invention can be utilized to shift the double bond of an olefinic hydrocarbon such as 1-pentene, 1-hexene, 2-hexene, and 4-methyl-1-pentene to a more centrally located position so that 2-pentene, 2-hexene, 3-hexene and 4-methyl-2-pentene, respectively, can be obtained. It is not intended to limit this invention to these enumerated olefinic hydrocarbons as it is contemplated that shifting of the double bond to a more centrally located position may be effective in straight or branched chain olefinic hydrocarbons containing up to about 20 carbon atoms per molecule. Preferred are linear $C_4$-$C_7$ alpha-mono-olefins. The process of this invention also applies to the hydroisomerization of olefins wherein olefins are converted to branched-chain paraffins.

Further, the process of this invention is also applicable to the isomerization of isomerizable alkylaromatic hydrocarbons including ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the monocyclic alkylaromatic hydrocarbons, that is, the alkyl benzene hydrocarbons, particularly the $C_8$ alkylbenzenes, and nonequilibrium mixtures of the various $C_8$ aromatic isomers.

These foregoing isomerizable hydrocarbons may be derived as selective fractions from various naturally-occurring petroleum streams either as individual components or as certain boiling range fractions obtained by the selective fractionation and distillation of catalytically cracked gas oil. Thus, the process of this invention may be successfully applied to and utilized for complete conversion of isomerizable hydrocarbons when these isomerizable hydrocarbons are present in minor quantities in various fluid or gaseous streams. Thus, the isomerizable hydrocarbons for use in the process of this invention need not be concentrated. For example, isomerizable hydrocarbons appear in minor quantities in various refinery streams, usually diluted with gases such as hydrogen, nitrogen, methane, ethane, propane, etc. These refinery streams containing minor quantities of isomerizable hydrocarbons are obtained in petroleum refineries and various refinery installation including thermal cracking units, catalytic cracking units, thermal reforming units, coking units, polymerization units, dehydrogenation units, etc. Such refinery offstreams have in the past often been burned for fuel value, since an economical process for the utilization of the hydrocarbon content has not been available. This is particularly true for refineary fluid streams known as off gas streams containing minor quantities of isomerizable hydrocarbons.

As indicated in the embodiments, the catalyst utilized in the present isomerization process comprises alumina having combined therewith a platinum group component, a rhenium component, and a halogen component. Considering first the alumina utilized in this catalyst, it is preferred that the alumina material be porous, adsorptive, high surface area support having a surface area of about 25 to about 500 or more $m^2$/gm. Suitable alumina materials are the crystalline aluminas know as gamma-, eta-, and theta-alumina, with gamma-alumina giving best results. In addition, in some embodiments the alumina support may contain minor proportions of other well know refractory inorganic oxides such as silica, zirconia, magnesia, etc. However, the preferred support is substantially pure gamma-alumina. In fact, an especially preferred support has an apparent bulk density of about 0.30 gm/cc to about 0.70 gm/cc and surface area characteristics such that the average pore diameter is about 50 to about 150 A, the pore volume is about 0.10 to about 1.0 ml/gm, and the surface area is about 80 to about 350 $m^2$/gm.

The alumina support may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina support may be prepared by adding a suitable alkaline reagent, such as ammonium hydroxide to a salt of aluminum such as aluminum chloride, aluminum nitrate, etc. in an amount to form an aluminum hydroxide gel which upon drying and calcinating is converted to alumina. The alumina may be formed in any desired shape such as spheres, pills, cakes, extrudates, powders, granules, etc. For the purpose of the present invention a particularly preferred form of alumina is the sphere; and alumina spheres may be continuouosly manufactured by the well known oil drop method which comprises forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatment in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See U.S. Pat. No. 2,620,314 for additional details regarding this oil drop method.

An essential constituent of the catalyst of the present invention is a halogen component. Although the precise form of the chemistry of the association of the halogen component with the alumina support is not entirely known, it is customary in the art to refer to the halogen component as being combined with the alumina support, or with the other ingredients of the catalyst. This combined halogen may be either fluorine, chlorine, iodine, bromine, or mixtures thereof. Of these, fluorine and particularly, chlorine are preferred for the purposes of the present invention. In addition, fluorine and chlorine may be utilized together. The halogen may be added to the alumina support in any suitable manner, either during preparation of the support or before or after the addition of the catalytically active metallic components. For example, the halogen may be added, at any stage of the preparation of the support or to the calcined support, as an aqueous solution of an acid such as hydrogen fluoride, hydrogen chloride, hydrogen bromide, etc., or as an acid salt such as ammonium bifluoride, etc. The halogen component or a portion thereof, may be composited with alumina during the impregnation of the latter with the platinum group component; for example, through the utilization of a mixture of chloroplatinic acid and hydrogen chloride. In another situation the alumina hydrosol which is typically utilized to form the alumina component, may contain halogen and thus contribute at least a portion of the halogen component to the final composite. In any event, the halogen will be typically composited with the alumina support in such a manner as to result in a final composite that contains on an elemental basis, about 0.1 percent to about 5 percent and preferably about 0.4 to about 1 percent by weight of chlorine when chlorine is used as the halogen or about 0.5 to about 3.5 percent by weight when fluorine is utilized.

As indicated above, the catalyst of the present invention also contains a platinum group metallic component. Although the process of the present invention is specifically directed to the use of a catalytic composite containing platinum, it is intended to include other platinum group metals such as palladium, rhodium, ruthenium, etc. Preferred is platinum, palladium and compounds thereof. The platinum group metallic component, such as platinum, may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.01 about 1 percent weight of the final catalytic composite calculated on an elemental basis. Excellent results are obtained when the catalyst contains about 0.3 to about 0.9 wt. percent of the platinum group metal.

The platinum group metallic component may be incorporated in the catalytic composite in any suitable manner such as coprecipitation of cogellation with the alumina support, ion-exchange with the alumina support and/or alumina hydrogel, or impregnation of the alumina support and/or alumina hydrogel at any stage in its preparation either after or before calcination of the alumina hydrogel etc. The preferred method of preparing the catalyst involves the utilization of a water soluble compound of the platinum group metals to impregnate the alumina support. Thus, the platinum group metal may be added to the support by commingling the latter with an aqueous solution of chloroplatinic acid. Other water-soluble compounds of platinum may be employed as impregnation solutions and include ammonium chloroplatinate, platinum chloride, dinitro diamino platinum, etc., but not necessarily with equivalent results. The utilization of a platinum chloride compound, such as chloroplatinic acid, is preferred since it facilitates the incorporation of both the platinum component and at least a minor quantity of the halogen component in a single step. Hydrogen chloride is also generally added to the impregnation solution in order to further facilitate the incorporation of the halogen component. In addition, it is generally preferred to impregnate the support after it has been calcined in order to minimize the risk of washing away the valuable platinum metal compounds; however, in some cases it may be advantageous to impregnate the support when it is in a gelled state. Following the impregnation, the resulting impregnated support is dried and subjected to a high temperature calcination or oxidation technique which is identical to the one hereinabove set forth in conjunction with the description of the preparation of the alumina support.

Another essential constituent of the catalyst used in the process of the present invention is the rhenium component. This component may be present as an elemental metal, as a chemical compound, such as the oxide, sulfide, halide, or in a physical or chemical association with the alumina support and/or the other components of the catalyst. Generally, the rhenium component is utilized in an amount sufficient to result in a final catalytic composite containing about 0.01 to about 1 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processiing involving washing and purification treatments. The preferred procedure for incorporating the rhenium component involves the impregnatiton of the alumina support either before, during, or after the other components referred to above are added. The impregnation solution can in some cases be an aqueous solution of a suitable acidic rhenium salt such as an aqueous solution of a rhenium halide such as the chloride; however, the preferred impregnation solution is an aqueous solution of perrhenic acid. In general, the rhenium component can be impregnated either prior to, simultaneously with, or after the platinum group metallic component is added to the support. However, I have found that best results are achieved when the rhenium component is impregnated simultaneously with the platinum group metallic component. In fact, I have determined that a preferred impregnation solution contains chloroplatinic acid, hydrogen chloride, and perrhenic acid.

In addition, I have determined that an especially preferred catalytic composite is prepared when the weight ratio, calculated on an elemental basis, of the rhenium component to the platinum group metallic component is selected from the range of about 0.05:1 to about 2.75:1. This is particularly true when the total weight content of the rhenium component plus the platinum group metallic component in the catalytic composite is fixed in the range of about .2 to about 1.5 wt. percent and more preferably about 0.4 to about 1.0, calculated on an elemental basis. Accordingly, examples of especially preferred catalytic composites are composites containing: 0.1 wt. % Re + 0.65 wt. % Pt, 0.2 wt. % Re + 0.55 wt. % Pt, 0.375 wt. % Re + 0.375 wt. % Pt, 0.55 wt. % Re + 0.20 wt. % Pt, and 0.65 wt. % Re + 0.10 wt. % Pt. However, if sulfur is present in the feed in amounts greater than about 1 ppm., a platinum to rhenium mole ratio greater than one is preferred.

Another constituent of the catalyst of the present invention may be a technetium component either in place of or in conjunction with rhenium. This component may be present as an elemental metal, as a chemical compound such as the oxide, sulfide, halide, or in a physical or chemical association with the alumina support and/or the other compents of the catalyst. Generally, the technetium component is utilized in an amount sufficient to result in a final catalytic composite containing about 0.01 to about 1 wt. percent technetium calculated as elemental metal. The technetium componet may be incorporated in the catalytic composite in any suitable manner and at any stage in the preparation of the catayst. As a general rule, it is advisable to introduce the technetium at a later step of the preparation in order that the expensive metal will not be lost due to subsequent processing involving washing and purification treatments. The preferred procedure for incorporating the technetium component involves the impregnation of the alumina carrier material either before, during, or after the other components referred to above are added. The impregnation solution can in some cases be an aqueous solution of a suitable acidic technetium salt such as an aqueous solution of a technetium halide such as the chloride; however, the preferred impregnation solution is an aqueous solution of pertechnic acid (HTcO$_4$). In general, the technetium component can be impregnated either prior to, simultaneously with, or after the platinum group metallic component is added to the support. However, best results are achieved when the technetium component is impregnated simultaneously with the platinum group metallic component. In fact, a preferred impregnation solution contains chloroplatinic acid, hydrogen chloride, and pertechnic acid.

As is well known to those skilled in the art, technetium is an artifically prepared element that apparently does not exist in nature. Recently, it has become available in commercial quantities from the Atomic Energy Commission because it is one of the by-products formed during the operation of a nuclear fission reactor. The isotope of technetium which is preferred for use in the present invention is the one with an atomic weight of 99; it is radioactive and is reported to possess a half-life of about $4.7 \times 10^{+5}$ years. Naturally, suitable safeguards designed to protect against radioactivity must be used both during the preparation of the catalyst of the present invention and the use thereof in the conversion of hydrocarbons.

Regardless of the details of how the components of the catalyst are composited with the alumina support, the final catalyst generally will be dried at a temperature of from about 200° F. to about 600° F. for a period of from about 2 to 24 hours or more and finally calcined at a temperature of about 700° F. to about 1100° F. for a period of about 0.5 to 10 hours, and preferably about 1 to about 5 hours.

It is preferred that the resultant calcined catalytic composite be subjected to a substantially water-free reduction prior to its use in the conversion of hydrocarbons. This step is designed to insure a uniform and finely-divided dispersion of the metallic components throughout the alumina support. Preferably, substantially pure and dry hydrogen (i.e. less than 20 vol. ppm. H$_2$O) is used as the reducing agent in this step. The reducing agent is contacted with the calcined catalyst at a temperature of about 800° F. to about 1200° F. and for a period time of about 0.5 to 10 hours or more effective to substantially reduce both metallic components to their elemental state. This reduction treatment may be performed in situ as part of a start-up sequence if precautions are taken to predry the plant to a substantially water-free state and if substantially water-free hydrogen is used.

Although not essential, the resulting catalytic composite can be impregnated with an anhydrous Friedel-Crafts type metal halide, particularly aluminum chloride. Other suitable metal halides are aluminum bromide, ferric chloride, ferric bromide, zinc chloride, beryllium chloride, etc. This impregnation can be accomplished by the sublimation of the aluminum chloride on to the rhenium - platinumalumina composite under conditions such that the sublimed aluminum chloride is chemically combined with the hydroxyl groups of the composite. This reaction is accompanied by the elimination of from about 0.5 to about 2.0 moles of hydrogen chloride per mole of aluminum chloride reacted.

Since aluminum chloride sublimes at about 184° C. suitable impregnation temperatures range from about 190° C. to about 700° C.; preferably, 200° C. to about 600° C. The sublimation can be conducted at atmospheric pressure or under increased pressures and in the presence of diluents such as inert gases, hydrogen and light paraffinic hydrocarbons. The impregnation may be conducted batchwise but a preferred method is to pass sublined AlCl$_3$ vapors in admixture with an inert gas such as H$_2$ through the calcined catalyst bed. This method both continuously deposits the AlCl$_3$ and removes the evolved HCl.

The amount of metal halide combined with the rhenium-platinum-alumina composite may range from about 5 percent to about 100 wt. percent of the original composite. The final composite has unreacted metal halide removed by treating the composite at a temperature above 300° C. for a time sufficient to remove therefrom any unreacted metal halide. For aluminum chloride, temperatures of about 400° C. to about 600° C. and times of from about 1 to about 48 hours are satisfactory. The reaction of the aluminum chloride with the hydroxyl groups of the alumina composite yields - Al - O - AlCl$_2$ active centers which can enhance the catalytic behavior of the original platinum-rhenium-alumina composite, particularly for C$_4$-C$_7$ n-alkanes.

In addition, the resulting reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more.

According to the present invention, the isomerizable hydrocarbon, in admixture with hydrogen, is contacted with a catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catayst and of well known operational advantages, it is preferred to use a fixed bed system. In this system a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion. In addition, it is to be noted that the reactants may be in the liquid phase, a mixed liquid-vapor phase, or a vapor phase when they contact the catalyst, with best results obtained in the vapor phase.

The process of this invention, utilizing the catalyst hereinbefore set forth, for isomerizing isomerizable olefinic or saturated hyrocarbons is preferably effected in a continuous flow, fixed bed system. One particular method is continuously passing the hydrocarbon to a reaction zone containing the catalyst and maintaining the zone at proper isomerization conditions such as a temperature in the range of about 0° to about 425° C. or more, and a pressure of about atmospheric to about 200 atmospheres or more. The hydrocarbon is passed over the catalyst at a liquid hourly space velocity (defined as volume of liquid hydrocarbon passed per hour per volume of catalyst) of from about 0.1 to about 20 hr.$^{-1}$ or more. In addition, diluents such as argon, nitrogen, or hydrogen may be present. In fact, the presence of hydrogen at a hydrogen to hydrocarbon mole ratio of about 0.1:1 to about 10:1 is preferred. The isomerized product is continuously withdrawn, separated from the reactor effluent, and recovered by conventional means, preferably fractional distillation, while the unreacted starting material may be recycled to form a portion of the feedstock.

Likewise, the process of this invention for isomerizing an isomerizable alkylaromatic hydrocarbon is also preferably effected by passing the aromatic to a reaction zone containing the hereinbefore described ctalyst and maintaining the zone at proper alkylaromatic isomerization conditions such as a temperature in the range of about 0° C. to about 600° C. or more, and a pressure of atmospheric to about 100 atmospheres or more. The hydrocarbon is passed, in admixture with hydrogen, at a liquid hourly hydrocarbon space velocity of about 0.1 to about 20.0 hr.$^{-1}$ or more and a hydrogen to hydrocarbon mole ratio of about 0.5:1 to about 20:1. Other inert diluents such as nitrogen, argon, etc. may also be present. The isomerized product is continually withdrawn, separated from the reactor effluent by conventional means such as fractional distillation or crystallization, and recovered.

EXAMPLES

The following examples are given to illustrate the preparation of the catalyst composite to be utilized in the process of this invention and its use in the isomerization of isomerizable hydrocarbons. However, these examples are not presented for purposes of limiting the scope of the invention but in order to further illustrate the embodiment of the present process.

EXAMPLE I

An alumina supporting material comprising 1/16 inch spheres is prepared by forming an aluminum hydroxyl chloride sol by dissolving aluminum pellets in hydrochloric acid; adding hexamethylenetetramine to the sol; gelling the resulting solution by dropping into an oil bath to form particles of an alumina hydrogel; aging and washing the resulting particles; and finally, drying and calcining the aged and washed particles to form gamma-alumina particles containing about 0.3 wt. percent combined chloride. Additional details as to this method are given in the teachings of U.S. Pat. No. 2,620,314.

The resulting gamma-alumina particles are then contacted with an impregnation solution containing chloroplatinic acid, hydrogen chloride, and perrhenic acid in amounts sufficient to yield a final composite containing 0.60 wt. percent platinum, 0.2 wt. percent rhenium, and 0.85 wt. percent combined chloride -- all calculated on an elemental basis. The impregnated spheres are then dried at a temperature of 300° F. for about an hour and calcined in an air atmosphere at a temperature of about 975° F. for about 1 hour.

The resulting impregnated particles are then reduced by contacting them with a substantially water-free hydrogen stream (i.e. containing less than 1 volume ppm. water) at a temperature of about 1020° F., a pressure slightly above atmospheric and a flow rate of the hydrogen stream through the catalyst particles sufficient to result in a gas hourly space velocity (GHSV) of about 720 hr.$^{-1}$ for about 1 hour.

EXAMPLE II

A portion of the catalyst produced by the method of Example I is placed in a continuous flow, fixed-bed isomerization plant of conventional design. Substantially pure metaxylene is used as the charge stock. The charge stock is commingled with about 8 moles of $H_2$ per mole of hydrocarbon, heated to about 400° C., and continuously charged to the reactor containing the catalyst which is maintained at about a pressure of about 300 psig. Substantial conversion of metaxylene to paraxylene is obtained.. ...i.e. greater than 80 percent of equilibrium.

EXAMPLE III

Another portion of the catalyst produced by Example I is used to isomerize ethylbenzene. The reactor is maintained at 300 psig. and 410° C. as ethylbenzene, commingled with 8 moles of $H_2$ per mole of ethylebenzene is continously passed to the reactor at 2 LHSV. Substantial conversion of ethylbenzene to the three xylene isomers is observed.

EXAMPLE IV

Another portion of the catalyst produced by Example I is used to isomerize ortho-xylene to para-xylene. The reactor is maintained at a temperature of 400° C., and a pressure of 300 psig. as orthoxylene, commingled with 8 moles of $H_2$ per mole of orthoxylene is passed to the reactor at a liquid hourly space velocity (LHSV) of 2.0 hr.$^{-1}$. Substantial conversion -- i.e. greater than 80 percent of equilibrium conversion -- of orthoxylene to paraxylene is obtained.

EXAMPLE V

A catalyst identical to that produced in Example I but containing only 0.40 wt. % combined chloride is used to isomerize 1-butene at a pressure of about 500 psig. and a temperature of about 140° C. in an appropriate continuous isomerization reactor. Substantial conversion to 2-butene is obtained.

EXAMPLE VI

Another portion of the catalyst utilized in Example V is charged to an appropriate continuous isomerization reactor maintained at a pressure of about 1000 psig. and a temperature of about 180° C. 3-methyl-1-butene is continuously passed to this reactor and a substantial conversion to 2-methyl-2-butene is obtained.

EXAMPLE VII

Another catalyst identical to that produced in Example I, except that the gamma-alumina particles are contacted with hydrogen fluoride to provide a 2.7 wt. percent combined fluoride content, is placed in an appropriate continuous isomerization reactor maintained at a pressure of about 300 psig. and a temperature of about 200° C. Normal hexane is continuously charged to the reactor and an analysis of the product stream shows substantial conversion to 2,2-diemthylbutane, 2,3-dimethylbutane, 2-methylpentane, and 3-methylpentane.

EXAMPLE VIII

One hundred grams of the reduced platinum-rheniumalumina composite of Example I are placed in a glass-lined rotating autoclave along with 75 grams of anhydrous aluminum chloride. The autoclave is sealed, pressured with 25 psi of hydrogen and heated and rotated for 2 hours at 250° C. The autoclave is allowed to cool, depressured through a caustic scrubber, opened and the final composite removed therefrom. Weighting of this composite indicates a 15 wt. percent gain equivalent to the aluminum chloride sublimed and reacted thereon. The caustic scrubber is found to have absorbed hydrogen chloride equivalent to about 5.0 wt. percent of the original composite corresponding to about .8 mole of HCL per mole of ACl$_3$ adsorbed.

EXAMPLE IX

A portion of the catalyst of Example VIII is used to isomerize normal butane at a pressure of 300 psig., a 0.5 hydrogen to hydrocarbon mole ratio, and a 1.0 LHSV at a temperature of 230° C. Substantial conversion of n-butane to isobutane is observed - approximately a conversion of n-butane to isobutane of about 45 wt. % of the butane charge.

EXAMPLE X

Another portion of the catalyst of Example VII is placed in an appropriate continuous isomerization reactor maintained at a temperature of about 210° C. and a pressure of about 250 psig. Methylcyclopentane is continuously passed to this reactor and a substantial conversion to cyclohexane is observed.

I claim as my invention:

1. A process for isomerizing an isomerizable alkylaromatic hydorcarbon which comprises contacting said hydrocarbon with a catalytic composite of alumina having combined therewith a platinum group metallic component, a halogen component, and a rhenium component at isomerization conditions including a temperature of about 0° C. to about 600° C., a pressure of about atmospheric to about 100 atmospheres, a liquid hourly space velocity of about 0.1 to about 20.0 hr.$^{-1}$, and a hydrogen to hydrocarbon mole ratio of about 0.5:1 to about 20:1.

2. The process of claim 1 further characterized in that said catalytic composite contains, on an elemental basis, about 0.1 to about 1.5 wt. percent chlorine, about 0.01 to about 1 wt. percent platinum group metal, and about 0.01 to about 1 wt. percent rhenium.

3. The process of claim 1 further characterized in that said catalytic composite contains, on an elemental basis, about 0.1 to about 3.5 percent fluorine, about 0.01 to about 1 wt. percent platinum group metal, and about 0.01 to about 1 wt. percent rhenium.

4. The process of claim 1 further characterized in that said platinum group component is platinum, a compound of platinum, palladium, or a compound of palladium.

5. The process of claim 1 further characterized in that said catalytic composite has a sulfur component combined therewith in an amount of about 0.05 to about 0.5 wt. percent of the composite.

6. The process of claim 1 further characterized in that said alkylaromatic is a C$_8$ alkylaromatic or a non-equilibrium mixture of C$_8$ alkylaromatics.

7. The process of claim 6 further characterized in that said C$_8$ alkylaromatic is a xylene or a mixture of non-equilibrium xylenes.

8. The process of claim 7 further characterized in that said xylene is metaxylene.

9. A process for isomerizing an alkylaromatic hydrocarbon which comprises contacting said hydrocarbon, hydrogen and a catalyst comprising about 0.01 to about 1.0 weight percent of a platinum group component, about 0.01 to about 1.0 weight percent of a rhenium component, and about 0.1 to about 5 weight percent halogen associated with an alumina carrier under isomerization conditions including a hydrogen to hydrocarbon mole ratio of from 0.5:1 to about 20:1.

10. The process of claim 9 further characterized in that said platinum group component is platinum.

11. The process of claim 10 further characterized in that said isomerization conditions include a temperature from about 0° C. to about 600° C., a pressure from about atmospheric to about 100 atmospheres and a liquid hourly space velocity from about 0.1 to about 20.0 hr.$^{-1}$.

12. The process of claim 9 further characterized in that said halogen is in an amount of from about 0.1 to about 1.5 weight percent.

* * * * *